(12) United States Patent
Ichihashi et al.

(10) Patent No.: US 7,094,357 B2
(45) Date of Patent: Aug. 22, 2006

(54) COMPATIBILIZING AGENT, POLYESTER POLYOL MIXTURE CONTAINING THE SAME, AND HOT-MELT ADHESIVE OBTAINED FROM THE MIXTURE

(75) Inventors: Hideki Ichihashi, Yamaguchi (JP); Yukio Kaneko, Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 24 days.

(21) Appl. No.: 10/320,928

(22) Filed: Dec. 16, 2002

(65) Prior Publication Data
US 2003/0149216 A1   Aug. 7, 2003

(30) Foreign Application Priority Data
Dec. 20, 2001   (JP) ............... P.2001-387015

(51) Int. Cl.
*C09K 3/00* (2006.01)
*C09K 5/11* (2006.01)
*C07C 69/34* (2006.01)
*C07C 69/44* (2006.01)

(52) U.S. Cl. .......... 252/182.25; 252/182.27; 252/182.28; 252/182.29; 528/302; 560/198

(58) Field of Classification Search ........... 252/182.25, 252/182.27, 182.28, 182.29; 528/302; 560/198
See application file for complete search history.

(56) References Cited

U.S. PATENT DOCUMENTS

| | | | | |
|---|---|---|---|---|
| 4,487,919 A | * | 12/1984 | Trotter et al. ........... | 528/272 |
| 4,672,094 A | * | 6/1987 | Nelb et al. ........... | 525/440 |
| 5,019,638 A | | 5/1991 | Müller et al. | |
| H1279 H | * | 1/1994 | Stephenson ........... | 524/317 |
| 5,434,238 A | * | 7/1995 | White et al. ........... | 528/272 |
| 5,480,962 A | * | 1/1996 | White et al. ........... | 528/272 |
| 5,498,453 A | * | 3/1996 | White et al. ........... | 428/35.7 |
| 5,589,566 A | * | 12/1996 | White et al. ........... | 528/286 |
| 6,133,400 A | * | 10/2000 | Helmeke ........... | 528/83 |
| 6,747,117 B1 | * | 6/2004 | Gajewski ........... | 528/61 |
| 6,780,958 B1 | * | 8/2004 | DeGuia ........... | 528/79 |

FOREIGN PATENT DOCUMENTS

| | | |
|---|---|---|
| EP | 0 484 761 A1 | 5/1992 |
| EP | 0 492 824 A2 | 7/1992 |
| EP | 1 149 850 A1 | 10/2001 |
| JP | 2-88686 A | 3/1990 |
| JP | 4-304223 A | 10/1992 |

* cited by examiner

*Primary Examiner*—Rabon Sergent
(74) *Attorney, Agent, or Firm*—Akin Gump Strauss Hauer & Feld, LLP

(57) ABSTRACT

A compatibilizing agent is described for a mixture of (1) a polyester polyol containing units derived from
at least one aliphatic dicarboxylic acid (A) having n carbon atoms ($10 \leq n \leq 20$) and
at least one aliphatic diol having k carbon atoms ($2 \leq k \leq 12$) and (2) a polyester polyol containing units derived from
at least one aliphatic dicarboxylic acid (B) having m carbon atoms ($2 \leq m \leq 9$) and
at least one aliphatic diol having k carbon atoms ($2 \leq k \leq 12$), the compatibilizing agent containing a polyester polyol which contains units derived from
at least one aliphatic dicarboxylic acid (A) having n carbon atoms ($10 \leq n \leq 20$),
at least one aliphatic dicarboxylic acid (B) having m carbon atoms ($2 \leq m \leq 9$), and
at least one aliphatic diol having k carbon atoms ($2 \leq k \leq 12$)

and in which the ratio of ingredient (A) to ingredient (B) used is from 90:10 to 10:90 in terms of molar ratio (provided that $n-m \geq 4$).

4 Claims, No Drawings

COMPATIBILIZING AGENT, POLYESTER POLYOL MIXTURE CONTAINING THE SAME, AND HOT-MELT ADHESIVE OBTAINED FROM THE MIXTURE

FIELD OF THE INVENTION

The present invention relates to a compatibilizing agent useful in producing a mixture of polyester polyols which comprise aliphatic dicarboxylic acid units and aliphatic diol units and differ in the number of carbon atoms of the acid. The invention further relates to a polyester polyol mixture containing the compatibilizing agent and a hot-melt adhesive obtained from this mixture.

More particularly, the invention relates to a compatibilizing agent useful in producing a mixture of polyester polyols comprising dodecanedioic acid units, adipic acid units, and 1,6-hexanediol units, and to a polyester polyol mixture containing the compatibilizing agent and a hot-melt adhesive obtained from the mixture.

The invention provides a polyester polyol mixture which can be easily handled when used and attains a short bonding time. The hot-melt adhesive obtained therefrom has a reduced bonding time and is usable in various applications.

BACKGROUND OF THE INVENTION

Polyesters are industrially well known compounds, and various types of polyesters are in use. In particular, polyester polyols can be crosslinked and cured with various crosslinking agents, e.g., isocyanate compounds, and are frequently used in applications such as coating materials, adhesives, inks, and sealants.

Of such polyester polyols, crystalline polyester polyols not only have excellent mechanical properties but have the following property. At temperatures not lower than the melting point thereof, they can be handled as a relatively low-viscosity liquid; upon cooling to a temperature not higher than the crystallization temperature thereof, they solidify in a short time period through recrystallization. Owing to this property, the crystalline polyester polyols are coming to be increasingly utilized as components of reactive hot-melt adhesives, ink-jet inks for hot-melt use, etc.

In particular, use of reactive hot-melt adhesives is rapidly expanding because the adhesives are excellent in strength and bonding rate and highly suitable for use in assembly lines and because they meet the social demand for nonuse of solvents and energy saving. There also is a strong desire for improved suitability for use in continuous operation, and a reactive hot-melt adhesive having a higher setting rate is desired.

It is known that the degree of crystallization of a polyester polyol influences the setting rate thereof; this fact, which can be used for meeting that demand, is disclosed, e.g., in Setchaku, 1984, Vol.28, No.8, p.5 and ADHESIVES AGE, 1987, November issue, p.32. Namely, a polyester polyol having a high degree of crystallization is extremely advantageous for improving setting rate.

Known starting materials for those polyester polyols are as follows. Examples of polycarboxylic acid ingredients include terephthalic acid, isophthalic acid, succinic acid, adipic acid, azelaic acid, sebacic acid, and dodecanedioic acid. Examples of diol ingredients include ethylene glycol, propylene glycol, 1,4-butanediol, 1,5-pentanediol, 1,6-hexanediol, and 1,4-cyclohexanedimethanol. Of the polyester polyols obtained from combinations of these monomers, polyester polyols for use as a material for hot-melt adhesives having an improved setting rate are disclosed in Japanese Patent Laid-Open No. 88686/1990. These polyester polyols include one formed from dodecanedioic acid and 1,6-hexanediol, one formed from sebacic acid and 1,6-hexanediol, and one formed from dodecanedioic acid and ethylene glycol.

The polyester polyol formed from dodecanedioic acid and 1,6-hexanediol, in particular, has a far higher setting rate than in conventional techniques. However, this polyester polyol is used in limited amounts because dodecanedioic acid is expensive.

On the other hand, reactive hot-melt adhesives based on a highly crystalline polyester polyol have problems remaining unsolved, for example, that they have a low rate of moisture absorption and should hence be allowed to stand for a prolonged time period so as to have an increased bonding strength through crosslinking reactions with water.

Japanese Patent Laid-Open No. 304223/1992 discloses a mixture for urethane prepolymer production which is prepared by mixing a polyester polyol obtained using dodecanedioic acid with a polyester polyol obtained using an inexpensive acid ingredient, e.g., adipic acid.

However, the polyester polyol obtained using dodecanedioic acid has poor compatibility with the polyester polyol obtained using adipic acid, so that the mixture prepared by mixing these polyester polyols suffer phase separation. This means that when the polyester polyol mixture is reacted with a polyisocyanate in producing a urethane prepolymer, the reaction proceeds unevenly, resulting in impaired workability.

SUMMARY OF THE INVENTION

An aim of the invention is to provide a compatibilizing agent necessary for economical polyester polyol mixtures comprising a combination of a polyester polyol obtained using an aliphatic dicarboxylic acid having n carbon atoms ($10 \leq n \leq 20$) (e.g., dodecanedioic acid) so as to take advantage of properties attributable to the dicarboxylic acid and a polyester polyol obtained using an easily available aliphatic dicarboxylic acid having m carbon atoms ($2 \leq m \leq 9$) (e.g., adipic acid). Another aim of the invention is to provide a polyester polyol mixture which is obtained using the compatibilizing agent and which can be easily handled when used and attains a short bonding time. Still another aim of the invention is to provide a hot-melt adhesive obtained by reacting the polyester polyol mixture with a polyisocyanate and attains a short bonding time.

The present inventors made intensive investigations in order to overcome the problems described above. As a result, it has been found that a polyester polyol which comprises units derived from at least one aliphatic dicarboxylic acid (A) having n carbon atoms ($10 \leq n \leq 20$), at least one aliphatic dicarboxylic acid (B) having m carbon atoms ($2 \leq m \leq 9$), and at least one aliphatic diol having k carbon atoms ($2 \leq k \leq 12$) and in which the ratio of ingredient (A) to ingredient (B) used is from 90:10 to 10:90 in terms of molar ratio is an excellent compatibilizing agent for a mixture of (1) a polyester polyol comprising units derived from at least one aliphatic dicarboxylic acid (A) having n carbon atoms ($10 \leq n \leq 20$) and at least one aliphatic diol having k carbon atoms ($2 \leq k \leq 12$) and (2) a polyester polyol comprising units derived from
   at least one aliphatic dicarboxylic acid (B) having m carbon atoms ($2 \leq m \leq 9$) and
   at least one aliphatic diol having k carbon atoms ($2 \leq k \leq 12$) (provided that n-m$\geq 4$). The inventors have further found that a reactive hot-melt adhesive obtained by reacting these polyester polyols containing the compatibilizing agent with a polyisocyanate does not have a prolonged bonding time. The invention has thus been achieved.

In particular, it has been found that a polyester polyol which comprises dodecanedioic acid units, adipic acid units, and 1,6-hexanediol units and in which the ratio of the dodecanedioic acid to adipic acid used is from 90:10 to 10:90 by mole is an excellent compatibilizing agent for mixtures of a polyester polyol obtained from dodecanedioic acid and 1,6-hexanediol and a polyester polyol obtained from adipic acid and 1,6-hexanediol. It has further been found that a reactive hot-melt adhesive obtained by reacting polyester polyols containing the compatibilizing agent with a polyisocyanate retains the intact short bonding time attributable to dodecanedioic acid. The invention has been achieved based on these findings.

DETAILED DESCRIPTION OF THE INVENTION

The invention will be explained below in more detail.

The aliphatic dicarboxylic acid (A) having n carbon atoms ($10 \leq n \leq 20$) to be used for the invention is not particularly limited. However, preferred examples thereof include saturated and unsaturated, linear aliphatic dicarboxylic acids. More preferred examples thereof are aliphatic dicarboxylic acids (A) having n carbon atoms ($10 \leq n \leq 16$). Specific examples thereof include decanedioic acid (sebacic acid), undecanedioic acid, dodecanedioic acid, tetradecanedioic acid, and hexadecanedioic acid. Preferred of these are decanedioic acid and dodecanedioic acid. In the case where the aliphatic dicarboxylic acid (A) has structural isomers, a mixture of these may be used.

Furthermore, use of a mixture of two or more aliphatic dicarboxylic acids (A) poses no problem.

The aliphatic dicarboxylic acid (B) having m carbon atoms ($2 \leq m \leq 9$) to be used for the invention also is not particularly limited. However, preferred examples thereof include saturated and unsaturated, linear, aliphatic dicarboxylic acids. Specific examples thereof include oxalic acid, malonic acid, succinic acid, maleic acid, fumaric acid, glutaric acid, adipic acid, pimelic acid, suberic acid, and azelaic acid. Preferred of these are succinic acid, adipic acid, and suberic acid. More preferred is adipic acid.

In the case where the aliphatic dicarboxylic acid (B) has structural isomers, a mixture of these may be used.

Furthermore, use of a mixture of two or more aliphatic dicarboxylic acids (B) poses no problem.

The aliphatic diol having k carbon atoms ($2 \leq k \leq 12$) to be used for the invention is not particularly limited. However, preferred examples thereof include saturated and unsaturated, linear, aliphatic diols.

Specific examples thereof include ethylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol. Preferred of these are 1,4-butanediol, 1,6-hexanediol, 1,8-octanediol, 1,10-decanediol, and 1,12-dodecanediol. More preferred is 1,6-hexanediol. In the case where the aliphatic diol having k carbon atoms ($2 \leq k \leq 12$) has structural isomers, a mixture of these may be used.

Furthermore, use of a mixture of two or more aliphatic diols poses no problem.

In the aliphatic dicarboxylic acid (A) having n carbon atoms ($10 \leq n \leq 20$) and aliphatic dicarboxylic acid (B) having m carbon atoms ($2 \leq m \leq 9$) to be used for the invention, there is a limitation on m and n, i.e., n-m$\geq 4$.

This is because when the value of n-m is smaller than 4, the polyester polyol (1) comprising units derived from
   at least one aliphatic dicarboxylic acid (A) having n carbon atoms ($10 \leq n \leq 20$) and
   at least one aliphatic diol having k carbon atoms ($2 \leq k \leq 12$) is often compatible evenly with
the polyester polyol (2) comprising units derived from
   at least one aliphatic dicarboxylic acid (B) having m carbon atoms ($2 \leq m \leq 9$) and
   at least one aliphatic diol having k carbon atoms ($2 \leq k \leq 12$), making it unnecessary to use a compatibilizing agent.

The compatibilizing agent (3) used in the invention comprises a polyester polyol which comprises units derived from
   at least one aliphatic dicarboxylic acid (A) having n carbon atoms ($10 \leq n \leq 20$),
   at least one aliphatic dicarboxylic acid (B) having m carbon atoms ($2 \leq m \leq 9$), and
   at least one aliphatic diol having k carbon atoms ($2 \leq k \leq 12$) and in which the ratio of ingredient (A) to ingredient (B) used is from 90:10 to 10:90, preferably from 80:20 to 20:80, more preferably from 70:30 to 30:70, in terms of molar ratio.

This polyester polyol preferably is a polyester polyol formed by random copolymerization and/or a polyester polyol formed by block copolymerization.

In case where the ratio of ingredient (A) to ingredient (B) used is higher than 90:10 or lower than 10:90 in terms of molar ratio, the compatibilizing agent has no compatibilizing effect on the mixture of (1) a polyester polyol comprising units derived from at least one aliphatic dicarboxylic acid (A) having n carbon atoms ($10 \leq n \leq 20$) and units derived from at least one aliphatic diol having k carbon atoms ($2 \leq k \leq 12$) and (2) a polyester polyol comprising units derived from at least one aliphatic dicarboxylic acid (B) having m carbon atoms ($2 \leq m \leq 9$) and units derived from at least one aliphatic diol having k carbon atoms ($2 \leq k \leq 12$). In this case, the mixture separates into these components.

In the polyester polyol (1) to be used in the invention, which comprises units derived from at least one aliphatic dicarboxylic acid (A) having n carbon atoms ($10 \leq n \leq 20$) and units derived from at least one aliphatic diol having k carbon atoms ($2 \leq k \leq 12$), the content of the units derived from the aliphatic dicarboxylic acid (A) having n carbon atoms ($10 \leq n \leq 20$) and that of the units derived from the aliphatic diol having k carbon atoms ($2 \leq l \leq 12$) each is generally 80% by mole or higher, preferably 90% by mole or higher, more preferably 95% by mole or higher, based on all dicarboxylic acid or diol units.

In the polyol ester (2) to be used in the invention, which comprises units derived from at least one aliphatic dicarboxylic acid (B) having m carbon atoms ($2 \leq m \leq 9$) and units derived from at least one aliphatic diol having k carbon atoms ($2 \leq k \leq 12$), the content of the units derived from the aliphatic dicarboxylic acid (B) having m carbon atoms ($2 \leq m \leq 9$) and that of the units derived from the aliphatic diol having k carbon atoms ($2 \leq k \leq 12$) each is generally from 10% by mole or higher, preferably 30% by mole or higher, more preferably 50% by mole or higher, based on all dicarboxylic acid or diol units.

The polyester polyols (1), (2), and (3) can be obtained through known dehydrating polycondensation.

An example of the process will be explained below with respect to the case in which adipic acid, dodecanedioic acid, and 1,6-hexanediol are used.

The ratio of the amount of the hydroxyl groups of the 1,6-hexanediol to that of the carboxyl groups of the adipic acid and/or dodecanedioic acid is preferably from 1.02 to 1.5, more preferably from 1.05 to 1.3, in terms of equivalent ratio (hydroxyl group/carboxyl group). Specifically, a given amount of adipic acid and/or dodecanedioic acid and a given amount of 1,6-hexanediol are subjected to dehydrating polycondensation in the presence or absence of a catalyst at a temperature in the range of about from 150 to 250° C. for about from 3 to 20 hours to thereby conduct esterification.

Examples of the catalyst include titanium catalysts such as titanium tetrabutoxide and tin catalysts such as dibutyltin oxide. Use of such a catalyst is preferred in that the dehydrating polycondensation is accelerated. The catalyst may be introduced into the reactor together with 1,6-hexanediol and adipic acid and/or dodecanedioic acid. Alternatively, the catalyst may be added after the reactants have been preliminarily polymerized in the absence of a catalyst. In producing each of the polyester polyols, it is desirable to terminate most of the molecular ends by hydroxyl groups and to inhibit the formation of a carboxylic acid end. For this purpose, addition of the catalyst after preliminary polymerization is especially effective and is preferred.

The polyester polyols (1), (2), and (3) each have a number-average molecular weight of generally from 1,500 to 15,000, preferably from 2,000 to 10,000. In case where the molecular weight thereof is lower than the lower limit, the polyester polyols are insufficient in heat resistance, chemical resistance, and strength after cure. In case where the molecular weight thereof is higher than the higher limit, the polyester polyols, upon melting, have an increased melt viscosity and the melts are difficult to handle.

The polyalkylene glycol (4) which may be used in the invention is not particularly limited. Examples thereof include ordinary alkylene oxide polymers. Specific examples thereof include polyethylene glycol, polypropylene glycol (including polypropylene glycol terminated by ethylene oxide), and polytetramethylene glycol. Preferred of these is polypropylene glycol.

The molecular weight of the polyalkylene glycol (4) is not particularly limited. However, from the standpoint of handleability, the molecular weight thereof is generally from 700 to 5,000, preferably from 1,000 to 4,000, more preferably from 1,500 to 2,500.

When a polyalkylene glycol having too low a number-average molecular weight is used, there are cases where the polyalkylene glycol partly flies off during handling, making it impossible to maintain a sufficient bonding strength, although the polyester polyol mixture obtained has good compatiblity. When a polyalkylene glycol having too high a number-average molecular weight is used, the polyester polyol mixture obtained tends to have poor compatibility, and come to separate or become uneven.

The polyester polyol mixture to be used in the invention is one obtained by mixing the polyester polyols (1) and (2) with given amounts of the compatibilizing agent (3) and polyalkylene glycol (4).

The polyester polyols (1) and (2) each are used in an amount of preferably from 10 to 90 parts by weight, more preferably from 20 to 80 parts by weight, further preferably from 40 to 60 parts by weight, provided that the sum of the ingredients (1) and (2) is 100 parts by weight. The compatibilizing agent (3) is used in an amount of generally from 5 to 100 parts by weight, preferably from 8 to 60 parts by weight, more preferably from 10 to 40 parts by weight, per 100 parts by weight of the sum of the polyester polyols (1) and (2).

Too small amounts of ingredient (3) are undesirable in that sufficient compatibility cannot be obtained in the polyester polyol mixture. Too large amounts thereof are undesirable in that the compatibilizing agent reduce the crystallinity of the polyester polyol mixture obtained, resulting in a lowered setting rate.

The ratio of the polyalkylene glycol (4) to be used is generally from 0 to 50 parts by weight, preferably from 5 to 40 parts by weight, more preferably from 10 to 35 parts by weight, per 100 parts by weight of the sum of ingredients (1) and (2).

Too large amounts of the polyalkylene glycol (4) are undesirable in that the polyester polyol mixture has impaired compatibility, resulting in insufficient bonding strength.

Even when a polyalkylene glycol is not used at all, compatibility is satisfactory. However, there are cases where the polyester polyol mixture containing no polyalkylene glycol gives a hot-melt adhesive which has poor flexibility in members bonded therewith. There are also cases where the nonuse of a polyalkylene glycol exerts influences such as the necessity of a longer time period for curing with moisture absorption.

Although use of a polyalkylene glycol in an amount of 3 parts by weight or larger substantially eliminates such problems, the amount thereof is preferably 5 parts by weight or larger.

The polyisocyanate to be used in the invention is selected from ordinarily well known diisocyanates which are aromatic, aliphatic, and alicyclic and from polyfunctional or polymeric polyisocyanates. Specific examples thereof include 1,5-naphthylene diisocyanate, 4,4'-diphenylmethane diisocyanate, 4,4'-diphenyldimethylmethane diisocyanate, 4,4'-dibenzyl diisocyanate, tetraalkyldiphenylmethane diisocyanates, 1,3-phenylene diisocyanate, 1,4-phenylene diisocyanate, tolylene diisocyanate, butane 1,4-diisocyanate, hexamethylene diisocyanate, 2,2,4-trimethylhexamethylene diisocyanate, 2,4,4-trimethylhexamethylene diisocyanate, cyclohexane 1,4-diisocyanate, xylylene diisocyanate, isophorone diisocyanate, dicyclohexylmethane 4,4'-diisocyanate, 1,3-bis(isocyanatomethyl)cyclohexane, methylcyclohexane diisocyanate, and derivatives of these.

The ratio of the polyester polyol mixture to the polyisocyanate is not particularly limited, and may be in an ordinary range. Specifically, the ratio of the OH groups of the polyester polyol mixture to the NCO groups of the polyisocyanate is generally from 1:1.2 to 1:3.0, preferably from 1:1.5 to 1:2.5, in terms of molar ratio. Reaction conditions also are not particularly limited, and may be within ordinary ranges. Specifically, the reaction may be conducted at a temperature in the range of from 50 to 150° C. for about from 1 to 5 hours. The reaction may be conducted in a solvent.

The hot-melt adhesive obtained by reacting the polyester polyol mixture of the invention with a polyisocyanate has a viscosity as measured at 120° C. of generally 100,000 cP or lower, preferably from 1,000 to 50,000 cP, more preferably from 2,000 to 40,000 cP.

Although the hot-melt adhesive obtained by the invention can be used as it is, additive or other ingredients for use in ordinary hot-melt adhesives may be added thereto before use. Examples of such optional ingredients include plasticizers, thermoplastic polymers, tackifiers, fillers, and antioxidants.

The hot-melt adhesive according to the invention can be regulated with respect to bonding time and is hence suitable for use in a bonding step in continuous operations. Examples of such applications are in the shoe-making industry, wood-processing industry, papermaking industry, metal industry, and resin-processing industry.

The invention will be explained below in detail by reference to Examples, but the invention should not be construed as being limited thereto.

Analytical Methods (1) Hydroxyl Value, Acid Value, and Number-Average Molecular Weight The hydroxyl value and acid value of a polyester polyol were determined in accordance with JIS K 1557, and the number-average molecular weight thereof was calculated from the hydroxyl value.

(2) Melting Point and Crystallization Temperature

The melting point and crystallization temperature of a polyester polyol were determined from the temperatures corresponding to the maximum endothermic peak and maximum exothermic peak in differential thermal analysis (DSC). The DSC was conducted at a heating rate of 10° C./min and a cooling rate of –10° C./min.

REFERENCE EXAMPLES 1 TO 3

Synthesis of Polyester Polyols

Into a 500-mL flask equipped with a distillation device were introduced 114.34 g (0.496 mol) of dodecanedioic acid (referred to as DDA), 108.82 g (0.745 mol) of adipic acid (referred to as AA), and 160.00 g (1.354 mol) of 1,6-hexanediol (referred to as HD). The atmosphere in the flask was replaced with nitrogen. This flask was heated to 160° C., upon which water began to be distilled off. The reaction mixture in this state was continuously stirred at 160° C. for 1 hour and subsequently stirred at 170° C. for 2 hours and then at 180° C. for 3 hours. At this temperature, the contents in the flask were stirred at a reduced pressure of 100 mmHg for 0.5 hour, subsequently at 50 mmHg for 1 hour, and then at 10 mmHg for 3 hours. After the internal pressure was temporarily returned to ordinary pressure, 10 mg of titanium tetrabutoxide was added to the contents. The resultant mixture was stirred again at a reduced pressure of 10 mmHg for 8 hours to complete a dehydrating condensation reaction. Subsequently, a 1/10 N toluene solution of dibutyl phosphate was added to the reaction mixture in an amount 1.2 times by mole the amount of the titanium butoxide used for the polyester polyol synthesis. This mixture was stirred at 130° C. for 2 hours to deactivate the catalyst.

The melting point, crystallization temperature, hydroxyl value, acid value, and molecular weight of the polyester polyol obtained (referred to as DDA/AA=40/60) are summarized in Table 1. (This polyester polyol corresponds to Reference Example 3 (3) in Table 1).

In substantially the same manner as described above, a polyester polyol (Reference Example 1 (1)) was synthesized from dodecanedioic acid and 1,6-hexanediol in a DDA:HD molar ratio of 1:1.1 and a polyester polyol (Reference Example 2 (2)) was synthesized from adipic acid and 1,6-hexanediol in an AA:HD molar ratio of 1:1.1. The properties of these polyester polyols are also shown in Table 1.

TABLE 1

| | Dicarboxylic acid used | Diol used | Acid value KOH mg/g | Hydroxyl value KOH mg/g | Molecular weight | Melting point ° C. | Crystallization temperature ° C. |
|---|---|---|---|---|---|---|---|
| Reference Example 1 (1) | DDA | HD | 0.20 | 33.4 | 3300 | 70.4 | 57.3 |
| Reference Example 2 (2) | AA | HD | 0.04 | 31.0 | 3600 | 57.3 | 40.4 |
| Reference Example 3 (3) | DDA/AA (40/60) molar ratio | HD | 0.21 | 35.3 | 3200 | 61.3 | 37.0 |

In Reference Example 1, DDA and HD were used in a molar ratio of 1:1.1.
In Reference Example 2, AA and HD were used in a molar ratio of 1:1.1.

EXAMPLE 1

Compatibility

A mixture of the polyester polyols obtained in Reference Examples 1 to 3 was examined for compatibility.

In a 100-ml glass bottle having an inner diameter of 35 mm were placed 50 parts by weight of the polyester polyol synthesized in Reference Example 1 shown in Table 1, which comprised dodecanedioic acid units and 1,6-hexanediol units (referred to as DDA-HD), 50 parts by weight of the polyester polyol synthesized in Reference Example 2, which comprised adipic acid units and 1,6-hexanediol units (referred to as AA-HD), and 23 parts by weight of the polyester polyol synthesized in Reference Example 3 (DDA/AA=40/60) in such amounts as to result in a total amount of 30 g, the sum of the former two polyester polyols being 100 parts by weight. The contents were melted at 120° C. and stirred with a glass rod for 10 minutes while being heated. The stirring was stopped and the resultant mixture was allowed to stand at 120° C. for 24 hours. Thereafter, the state of the mixture was visually examined.

The state in which the three-component mixture was transparent and had been homogeneously compatibilized is indicated by ○, that in which the mixture was milk-white is indicated by Δ, and that in which the mixture had been separated into layers or separated to form a particulate phase is indicated by ×.

The polyester polyol mixture obtained was transparent and had been homogeneously compatibilized, and this state remained unchanged after the standing in the molten state. The results obtained are shown in Table 2.

EXAMPLES 2 TO 5

Polyester polyol mixtures were prepared in the same manner as in Example 1, except that the amount of the polyester polyol serving as a compatibilizing agent (Reference Example 3) was changed. The results obtained are shown in Table 2.

COMPARATIVE EXAMPLE 1

A polyester polyol mixture was prepared in the same manner as in Example 1, except that the polyester polyol serving as a compatibilizing agent (Reference Example 3) was not used. This polyester polyol mixture, which contained no compatibilizing agent, showed poor compatibility and separated into upper and lower layers upon standing in a molten state. The results obtained are shown in Table 2.

EXAMPLES 6 AND 7

Polyester polyol mixtures were prepared in the same manner as in Example 1, except that the proportion of the polyester polyol of Reference Example 1 ((1) DDA-HD) to the polyester polyol of Reference Example 2 ((2) AA-HD) was changed. The results obtained are shown in Table 2.

TABLE 2

| | (1) DDA-HD parts by weight | (2) AA-HD parts by weight | (3) DDA/AA-HD (DDA/AA: molar ratio) parts by weight | Compatibility |
|---|---|---|---|---|
| Comparative Example 1 | 50 | 50 | — | × |
| Example 2 | 50 | 50 | (40/60) 8 | Δ |
| Example 3 | 50 | 50 | (40/60) 11 | ○ |
| Example 4 | 50 | 50 | (40/60) 14 | ○ |
| Example 1 | 50 | 50 | (40/60) 23 | ○ |
| Example 5 | 50 | 50 | (40/60) 50 | ○ |
| Example 6 | 20 | 80 | (40/60) 23 | ○ |
| Example 7 | 80 | 20 | (40/60) 23 | ○ |

REFERENCE EXAMPLE 4

Method of Producing Block Copolymer

The polyester polyol (1), which comprised DDA units and HD units, and the polyester polyol (2), which comprised AA units and HD units, were introduced in a ratio of 50:50 by weight into a 500-ml flask in a total amount of 300 g. The atmosphere in the flask was replaced with nitrogen. This flask was heated to 180° C. Thereto was added 10 mg of titanium tetrabutoxide. The resultant mixture was stirred for 1 hour to conduct a transesterification reaction. Thereafter, the temperature in the flask was lowered to 130° C., and a 1/10 N toluene solution of dibutyl phosphate was added to the reaction mixture in an amount 1.2 times by mole the amount of the titanium tetrabutoxide. This mixture was stirred for 2 hours to deactivate the catalyst.

EXAMPLES 8 AND 9

Polyester polyol mixtures were prepared in the same manner as in Examples 1 and 4, except that the block copolymer obtained in Reference Example 4 was used as a compatibilizing agent in place of the polyester polyol obtained in Reference Example 3, which was a random copolymer. The results obtained are shown in Table 3.

TABLE 3

| | (1) DDA-HD parts by weight | (2) AA-HD parts by weight | (3) DDA/AA-HD (DDA-HD/AA-HD: weight ratio) parts by weight | Compatibility |
|---|---|---|---|---|
| Example 8 | 50 | 50 | (50/50) 14 | ○ |
| Example 9 | 50 | 50 | (50/50) 23 | ○ |

EXAMPLE 10

A polyester polyol mixture was prepared in the same manner as in Example 1, except that the polyester polyol shown in Table 4, which comprised units derived from AA, HD, and other monomers, was used in place of the polyester polyol obtained in Reference Example 2. This polyester polyol mixture was milk-white, and this state remained unchanged after 24-hour standing. The results obtained are shown in Table 4.

EXAMPLE 11

A polyester polyol mixture was prepared in the same manner as in Example 5, except that the polyester polyol shown in Table 4, which comprised units derived from AA, HD, and another monomer, was used in place of the polyester polyol obtained in Reference Example 2. This polyester polyol mixture was milk-white, and this state remained unchanged after 24-hour standing. The results obtained are shown in Table 4.

COMPARATIVE EXAMPLES 2 TO 4

Polyester polyol mixtures were prepared in the same manner as in Example 1, except that the polyester polyols shown in Table 4 were used in place of the polyester polyol obtained in Reference Example 2. After 24-hour standing, these polyester polyol mixtures each had separated into upper and lower layers. The results obtained are shown in Table 4.

TABLE 4

| | (2) Composition (molar ratio) parts by weight | (1) DDA-HD parts by weight | (3) DDA/AA-HD (DDA/AA: molar ratio) parts by weight | Compatibility |
|---|---|---|---|---|
| Example 10 | AA/TPA/IPA-HD/EG/NPG (60/20/20-35/50/15) 50 | 50 | (40/60) 23 | Δ |
| Example 11 | AA/TPA-HD (40/60-100) 50 | 50 | (40/60) 50 | Δ |
| Comparative Example 2 | AA/PA-EG/NPG (20/80-40/60) 50 | 50 | (40/60) 23 | X |
| Comparative Example 3 | IPA/TPA-HD/EG/BD (60/40-40/30/30) 50 | 50 | (40/60) 23 | X |
| Comparative Example 4 | PA/IPA-EG/NPG (50/50-50/50) 50 | 50 | (40/60) 23 | X |

AA: adipic acid,
PA: phthalic acid,
IPA: isophthalic acid,
TPA: terephthalic acid,
HD: 1,6-hexanediol,
BD: 1,4-butanediol,
EG: ethylene glycol,
NPG: neopentyl glycol

EXAMPLE 12

A mixture composed of the polyester polyols (1), (2), and (3) and a polyalkylene glycol (4) was examined for compatibility.

In a 100-ml glass bottle having an inner diameter of 35 mm were placed 50 parts by weight of the polyester polyol (1) (DDA-HD), 50 parts by weight of the polyester polyol (2) (AA-HD), 23 parts by weight of the polyester polyol (3) (DDA/AA=40/60), and 31 parts by weight of polypropylene glycol (4) having an average molecular weight of 2,000 (referred to as PPG(2000)) in such amounts as to result in a total amount of 30 g, the sum of the polyester polyols (1) and (2) being 100 parts by weight. The contents were melted at 120° C. and stirred with a glass rod for 10 minutes while being heated. The stirring was stopped and the resultant mixture was allowed to stand at 120° C. for 24 hours. Thereafter, the state of the mixture was visually examined.

The polyester polyol mixture obtained was transparent and had been homogeneously compatibilized, and this state remained unchanged after the standing in the molten state. The results obtained are shown in Table 5.

EXAMPLES 13 TO 16

Polyester polyol mixtures were prepared in the same manner as in Example 12, except that the proportion of the polyester polyol (3) to PPG(2000) (4) was changed. The results obtained are shown in Table 5.

COMPARATIVE EXAMPLE 5

A polyester polyol mixture was prepared in the same manner as in Example 12, except that the polyester polyol (3) was not used. This polyester polyol mixture, which did not contain the polyester polyol (3), showed poor compatibility and separated into upper and lower layers upon standing in a molten state. The results obtained are shown in Table 5.

COMPARATIVE EXAMPLE 6

A polyester polyol mixture was prepared in the same manner as in Example 12, except that the polyester polyol (3) and PPG(2000) (4) each were added in a higher proportion. This polyester polyol mixture, which contained the polyester polyol (3) in a large amount, showed satisfactory compatibility. However, the adhesive obtained from this mixture had a low setting rate, as will be shown later. The results obtained are shown in Table 5.

EXAMPLES 17 AND 18

Polyester polyol mixtures were prepared in the same manner as in Example 12, except that the proportion of the polyester polyol (1) to the polyester polyol (2) was changed. The results obtained are shown in Table 5.

TABLE 5

| | (1) DDA-HD parts by weight | (2) AA-HD parts by weight | (3) DDA/AA-HD (DDA/AA: molar ratio) parts by weight | (4) PPG parts by weight | Compatibility |
|---|---|---|---|---|---|
| Comparative Example 5 | 50 | 50 | — | 25 | X |
| Example 13 | 50 | 50 | (40/60) 8 | 27 | Δ |
| Example 14 | 50 | 50 | (40/60) 11 | 28 | ○ |
| Example 15 | 50 | 50 | (40/60) 14 | 29 | ○ |
| Example 12 | 50 | 50 | (40/60) 23 | 31 | ○ |
| Example 16 | 50 | 50 | (40/60) 50 | 38 | ○ |
| Comparative Example 6 | 50 | 50 | (40/60) 150 | 63 | ○ |

TABLE 5-continued

| | (1) DDA-HD parts by weight | (2) AA-HD parts by weight | (3) DDA/AA-HD (DDA/AA: molar ratio) parts by weight | (4) PPG parts by weight | Compatibility |
|---|---|---|---|---|---|
| Example 17 | 20 | 80 | (40/60) 23 | 31 | ○ |
| Example 18 | 80 | 20 | (40/60) 23 | 31 | ○ |

EXAMPLES 19 AND 20

Polyester polyol mixtures were prepared in the same manner as in Examples 12 and 15, except that the block copolymer obtained in Reference Example 4 was used as a compatibilizing agent in place of the polyester polyol (3), which was the random copolymer obtained in Reference Example 3. The results obtained are shown in Table 6.

TABLE 6

| | (1) DDA-HD parts by weight | (2) AA-HD parts by weight | (3) DDA-HD/AA-HD (DDA-HD/AA-HD: weight ratio) parts by weight | (4) PPG parts by weight | Compatibility |
|---|---|---|---|---|---|
| Example 19 | 50 | 50 | (50/50) 14 | 29 | ○ |
| Example 20 | 50 | 50 | (50/50) 23 | 31 | ○ |

EXAMPLE 21

A polyester polyol mixture was prepared in the same manner as in Example 12, except that the polyester polyol shown in Table 7, which comprised units derived from AA, HD, and other monomers, was used in place of the polyester polyol (2). This polyester polyol mixture was milk-white, and this state remained unchanged after 24-hour standing. The results obtained are shown in Table 7.

EXAMPLE 22

A polyester polyol mixture was prepared in the same manner as in Example 16, except that the polyester polyol shown in Table 7, which comprised units derived from AA, HD, and another monomer, was used in place of the polyester polyol (2). This polyester polyol mixture was milk-white, and this state remained unchanged after 24-hour standing. The results obtained are shown in Table 7.

COMPARATIVE EXAMPLES 7 TO 9

Polyester polyol mixtures were prepared in the same manner as in Example 12, except that the polyester polyols shown in Table 7 were used in place of the polyester polyol (2). After 24-hour standing, these polyester polyol mixtures each had separated into upper and lower layers. The results obtained are shown in Table 7.

TABLE 7

| | (2) Composition (molar ratio) parts by weight | (1) DDA-HD parts by weight | (3) DDA/AA-HD (DDA/AA: molar ratio) parts by weight | (4) PPG parts by weight | Compatibility |
|---|---|---|---|---|---|
| Example 21 | AA/TPA/IPA-HD/EG/NPG (60/20/20-35/50/15) 50 | 50 | (40/60) 23 | 31 | Δ |
| Example 22 | AA/TPA-HD (40/60-100) 50 | 50 | (40/60) 50 | 38 | Δ |
| Comparative Example 7 | AA/PA-EG/NPG (20/80-40/60) 50 | 50 | (40/60) 23 | 31 | X |
| Comparative Example 8 | IPA/TPA-HD/EG/BD (60/40-40/30/30) 50 | 50 | (40/60) 23 | 31 | X |
| Comparative Example 9 | PA/IPA-EG/NPG (50/50-50/50) 50 | 50 | (40/60) 23 | 31 | X |

AA: adipic acid,
PA: phthalic acid,
IPA: isophthalic acid,
TPA: terephthalic acid,
HD: 1,6-hexanediol,
BD: 1,4-butanediol,
EG: ethylene glycol,
NPG: neopentyl glycol

EXAMPLE 23

Synthesis of Adhesive

In a 500-ml separable flask were placed 50 parts by weight of the polyester polyol (1) obtained in Reference Example 1 (DDA-HD), 50 parts by weight of the polyester polyol (2) obtained in Reference Example 2 (AA-HD), 23 parts by weight of the polyester polyol (3) obtained in Reference Example 3 (DDA/AA=40/60), and 31 parts by weight of PPG(2000) (4) in such amounts as to result in a total amount of 80 g, the sum of the polyester polyols (1) and (2) being 100 parts by weight. The atmosphere in the flask was replaced with nitrogen. The contents were melted by heating to 120° C. and then dehydrated at 120° C. and 50 mmHg for 1 hour with stirring at 250 rpm. Nitrogen replacement was conducted for 10 minutes. At that temperature, the four ingredients showed satisfactory compatibility and the mixture was transparent and homogeneous. Thereafter, 4,4'-diphenylmethane diisocyanate (referred to as MDI) heated beforehand to 60° C. was added to the mixture at a time (in such an amount that the amount of the NCO groups was 1.1 time by mole the amount of the OH groups of the polyester polyol mixture introduced). The resultant mixture was stirred at 120° C. for 1.5 hours in a nitrogen atmosphere to thereby synthesize an adhesive.

The adhesive obtained was examined for isocyanate group content and setting time by the following property examination methods. The results obtained are shown in Table 8.

Property Examination Methods
(a) Isocyanate Group Content

The isocyanate group content of the adhesive synthesized by the method described above was calculated in the following manner.

From 3 to 6 g of the adhesive synthesized was introduced into a 300-ml Erlenmeyer flask having a ground stopper. The adhesive introduced was weighed and completely dissolved in 25 ml of toluene. Thereto was added 10 ml of a dibutylamine toluene solution (prepared by dissolving 26 g of dibutylamine in 200 ml of dry toluene). This flask was sufficiently shaken and then allowed to stand for 15 minutes. Thereto were added 100 ml of 2-propanol and Bromocresol Green indicator. The resultant mixture was titrated with N/2 hydrochloric acid with stirring.

Isocyanate Content (%)=21.01×(B−A)×f×100/S×1,000

A: amount of N/2 hydrochloric acid (ml) required for sample titration
B: amount of N/2 hydrochloric acid (ml) required for titration in a blank test
S: Weight of the polyester polyols (g)
f: factor of N/2 hydrochloric acid (b) Measurement of Setting Time Measurement was made in accordance with Japan Adhesion Industry Association Standards JAI 7, method A. A corrugated board (kraft paper liner, fluting B) was used as an adherend. Two kinds of test pieces each having a width of 50 mm and a length of 100 mm were prepared; one had flutes parallel to the width direction (test piece material C) and the other had flutes perpendicular thereto (test piece material D). The adhesive kept molten at 120° C. was applied to a surface of the test piece material C in a string form parallel to the flutes, and the back side of the test piece material D was superposed thereon in such a manner that the flutes of the material D crossed those of the material C. This assemblage was pressed to obtain a test piece. Conditions for this bonding operation included an adhesive application amount of 3 g/m, open time of 2 seconds, and pressing load of 2 kg. The adhesive was applied in an area located at a distance of 25 mm from one length-direction side of the test piece material C. While the pressing time was kept being measured with a stopwatch, the test pieces were released from the pressure immediately after the lapse of given time periods. Immediately after the pressure release, each bonded test piece was broken by peeling the test piece materials from each other. The shortest pressing time which caused material breakage in peeling the test piece materials and which resulted in a degree of material breakage of 80% in at least 80% of the bonded test pieces was taken as the setting time. This measurement of setting time was made in an atmosphere having a temperature of 23° C. The results obtained are shown in Table 8.

EXAMPLES 24 TO 26

Adhesives were produced in the same manner as in Example 23, except that the proportion of the polyester polyol (3) to PPG(2000) (4) was changed. The results obtained are shown in Table 8.

COMPARATIVE EXAMPLE 10

An adhesive was produced in the same manner as in Example 23, except that the polyester polyol (3) was not used. The results obtained are shown in Table 8.

COMPARATIVE EXAMPLE 11

An adhesive was produced in the same manner as in Example 23, except that the proportion of the polyester polyol (3) to PPG(2000) (4) was changed. The results obtained are shown in Table 8. This adhesive, which contained the polyester polyol (3) in a large amount, had a prolonged setting time.

COMPARATIVE EXAMPLE 12

An adhesive was produced in the same manner as in Example 23, except that the polyester polyol (3) was used as the only polyester polyol. The mixture composed of the polyester polyol (3) and the polypropylene glycol (PPG) showed satisfactory compatibility. However, the adhesive obtained had a prolonged setting time. The results obtained are also shown in Table 8.

TABLE 8

|  | (1) DDA-HD parts by weight | (2) AA-HD parts by weight | (3) DDA/AA-HD (DDA/AA: molar ratio) parts by weight | (4) PPG parts by weight | DDA mmol/g | NCO wt % | Setting time sec | Compatibility of polyester polyol mixture |
|---|---|---|---|---|---|---|---|---|
| Comparative Example 10 | 50 | 50 | — | 25 | 1.21 | 2.89 | 4 | X |
| Example 24 | 50 | 50 | (40/60) 11 | 27 | 1.20 | 2.93 | 4 | ○ |
| Example 25 | 50 | 50 | (40/60) 14 | 29 | 1.20 | 2.91 | 4 | ○ |
| Example 23 | 50 | 50 | (40/60) 23 | 31 | 1.20 | 2.76 | 5 | ○ |
| Example 26 | 50 | 50 | (40/60) 50 | 38 | 1.19 | 2.94 | 10 | ○ |
| Comparative Example 11 | 50 | 50 | (40/60) 150 | 63 | 1.17 | 2.60 | 18 | ○ |
| Comparative Example 12 | — | — | (40/60) 100 | 25 | 1.15 | 2.46 | 40 | ○ |

The values of DDA content (mmol/g) given in Table 8 each indicates the number of moles of DDA contained in the mixture of the polyols (1), (2), and (3). The results given in Table 8 show that even an adhesive having almost the same DDA content has a prolonged setting time when it contains the random copolymer as the only polyester polyol, as in Comparative Example 12.

EXAMPLES 27 AND 28

Hot-melt adhesives were produced in the same manner as in Examples 23 and 25, except that use was made of polyester polyol mixtures obtained using the block copolymer obtained in Reference Example 4 as a compatibilizing agent in place of the polyester polyol (3), which was the random copolymer obtained in Reference Example 3. The results obtained are shown in Table 9.

TABLE 9

|  | (1) DDA-HD parts by weight | (2) AA-HD parts by weight | (3) DDA/AA-HD (DDA-HD/AA-HD: weight ratio) parts by weight | (4) PPG parts by weight | DDA mmol/g | NCO wt % | Setting time sec | Compatibility of polyester polyol mixture |
|---|---|---|---|---|---|---|---|---|
| Example 27 | 50 | 50 | (50/50) 14 | 29 | 1.21 | 2.91 | 4 | ○ |
| Example 28 | 50 | 50 | (50/50) 23 | 31 | 1.21 | 2.76 | 5 | ○ |

The invention can provide: a compatibilizing agent necessary for economical polyester polyol mixtures comprising a combination of a polyester polyol obtained using an aliphatic dicarboxylic acid having n carbon atoms ($10 \leq n \leq 20$) (e.g., dodecanedioic acid) so as to take advantage of properties attributable to the dicarboxylic acid and a polyester polyol obtained using an easily available aliphatic dicarboxylic acid having m carbon atoms ($2 \leq m \leq 9$) (e.g., adipic acid); a polyester polyol mixture which is obtained using the compatibilizing agent and which can be easily handled when used and attains a short bonding time; and a hot-melt adhesive obtained by reacting the polyester polyol mixture with a polyisocyanate and attains a short bonding time.

While the invention has been described in detail and with reference to specific embodiments thereof, it will be apparent to one skilled in the art that various changes and modifications can be made therein without departing from the spirit and scope thereof.

What is claimed is:
1. A polyester polyol mixture which comprises
   (1) from 10 to 90 parts by weight of a polyester polyol comprising units derived from
      at least one aliphatic dicarboxylic acid (A) having n carbon atoms wherein n is from 10 to 20 and
      at least one aliphatic diol having k carbon atoms wherein k is from 2 to 12,
   (2) from 90 to 10 parts by weight of a polyester polyol comprising units derived from
      at least one aliphatic dicarboxylic acid (B) having m carbon atoms wherein m is from 2 to 9 and
      at least one aliphatic diol having k carbon atoms wherein k is from 2 to 12,

(3) from 5 to 100 parts by weight of a compatibilizing agent comprising a polyester polyol which comprises units derived from:
at least one aliphatic dicarboxylic acid (A) having n carbon atoms wherein n is from 10 to 20,
at least one aliphatic dicarboxylic acid (B) having m carbon atoms wherein m is from 2 to 9, and
at least one aliphatic diol having k carbon atoms wherein k is from 2 to 12;

in which n-m $\geq 4$ and the molar ratio of ingredient (A) to ingredient (B) in the compatibilizing agent is from 90:10 to 10:90 and (4) from 0 to 50 parts by weight of a polyalkylene glycol, provided that the sum of ingredients (1) and (2) is 100 parts by weight and n-m $\geq 4$.

2. The polyester polyol mixture of claim 1, wherein the aliphatic dicarboxylic acid (A) having n carbon atoms wherein n is from 10 to 20 is dodecanedioic acid, the aliphatic dicarboxylic acid (B) having m carbon atoms wherein m is from 2 to 9 is adipic acid, and the aliphatic diol having k carbon atoms wherein k is from 2 to 12 is 1,6-hexanediol.

3. The polyester polyol mixture of claim 2, wherein the polyalkylene glycol (4) is polypropylene glycol.

4. The polyester polyol mixture of claim 2, wherein the polyalkylene glycol (4) has a number average molecular weight of from 700 to 5,000.

* * * * *